United States Patent
Swet

[15] 3,635,425
[45] Jan. 18, 1972

[54] DEPLOYMENT METHOD FOR A TELESCOPING SOLAR ARRAY

[72] Inventor: Charles J. Swet, Mount Airy, Md.
[73] Assignee: The United States of America as represented by the Secretary of the Navy
[22] Filed: Oct. 1, 1969
[21] Appl. No.: 862,702

[52] U.S. Cl. .................................................. 244/1 SS
[51] Int. Cl. .................................................. B64g 1/00
[58] Field of Search .............. 244/1 SS; 136/89; 343/705, 343/705 S

[56] References Cited

UNITED STATES PATENTS

| | | | |
|---|---|---|---|
| 3,423,755 | 1/1969 | Lassen et al. | 244/1 SS X |
| 3,459,391 | 8/1969 | Haynos | 244/1 SS |
| 3,477,662 | 11/1969 | Anderson | 244/1 SS |
| 3,532,299 | 10/1970 | Williamson et al. | 244/1 SS |

Primary Examiner—Milton Buchler
Assistant Examiner—Jeffrey L. Forman
Attorney—R. S. Sciascia and J. A. Cooke

[57] ABSTRACT

A method for deployment of a solar cell array, conduction of generated power from the array to the satellite, and utilization of the array and deployment means as an aid for the gravity-gradient stabilization of the satellite. The method envisions telescoping sections of a solar cell array being extended in orbit by an erectable mast and boom assembly. Power is carried from the array through electrically conductive booms and twin conducting masts, thereby eliminating the need for electrical wiring and associated wiring guides and connectors. The extended solar array also assists in stabilizing the satellite by providing necessary gravity-gradient restoring moments. Multiple function of equipment increases the wattage to weight ratio of the array.

5 Claims, 5 Drawing Figures

PATENTED JAN 18 1972

INVENTOR
CHARLES J. SWET

BY

J.O.Tresansky
ATTORNEY

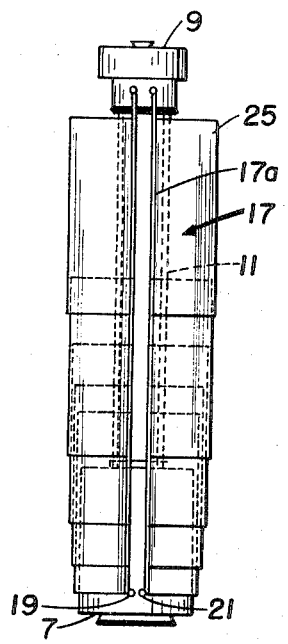
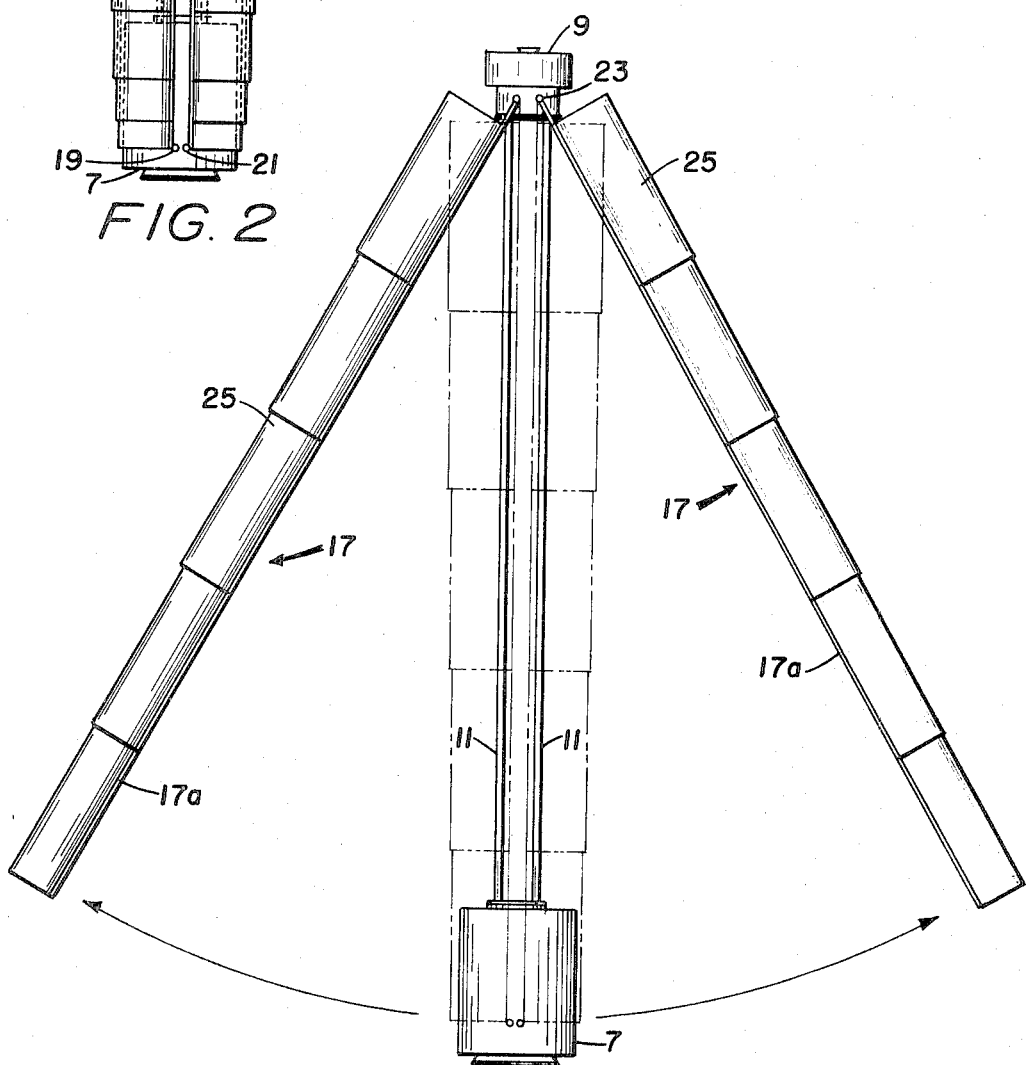

INVENTOR.
CHARLES J. SWET

DEPLOYMENT METHOD FOR A TELESCOPING SOLAR ARRAY

BACKGROUND AND SUMMARY OF THE INVENTION

Power requirements for a spacecraft of any considerable size, particularly one carrying a substantial living payload, become quite large. Solar cell arrays have long been used to advantage as a primary power source on such spacecraft in order to extend their useful orbital lives without the severe weight and inboard volume penalties encountered with present-day batteries. Due to launcher restrictions, the solar cell array must normally be stowed compactly aboard the spacecraft and erected after the spacecraft has been ejected from the launch vehicle. Further, the array must also receive substantial support in its stowed configuration in order to withstand the extremes of acceleration and vibration experienced during ascent to orbit.

The present invention generally relates to deployment methods for erection of solar cell arrays in space. More specifically, the invention relates to the deployment of various solar array configurations, to the conduction of generated power from the array to the satellite, and to the utilization of the array and associated deployment means as an aid for the gravity-gradient stabilization of the satellite.

According to the present invention, the solar cell array is substantially constructed of telescoping panels which compactly overlap when in nonextended, stowed positions. Extendable boom means joined to the outer telescoping panel erects the array incidental to the deployment of a main supporting mast. Power is carried from the deployed array to the spacecraft boom and mast assembly which is expeditiously constructed of electrically conductive material, thus eliminating the need for electrical wiring and associated wiring guides and connectors. The extending solar array also assists in stabilizing the satellite by providing necessary restoring moments. By utilizing well-known extendible structures and concomitant deployment mechanisms, the array can be deployed and, using certain array configurations, retracted for varying power requirements. Further, multiple functioning of the array erection means as described herein increases the wattage to weight ratio of the array.

The provision, therefore, of a method for deployment of a solar cell array is a primary object of the invention.

It is another object of the invention to provide a solar cell array deployment method wherein multiple functioning of the deployment means provides an increased wattage to weight ratio.

It is a more specific object of the invention to provide a solar array deployment method wherein telescoping sections of the array are sequentially erected on deployment of an extendible boom and mast assembly, said assembly further serving to conduct power from the array to the spacecraft and to assist in stabilizing the spacecraft by providing necessary restoring moments.

Further objects and advantages of the invention will become more readily apparent from the following detailed description of the preferred embodiment thereof.

BRIEF DESCRIPTION OF THE DRAWINGS

FIG. 2 is an elevation of the spacecraft after ejection from the launch vehicle and during deployment of an extendible mast and boom assembly;

FIG. 3 is an elevation of the spacecraft in which the mast, booms, and solar array are shown fully extended and deployed;

DESCRIPTION OF THE PREFERRED EMBODIMENTS

Although the method of the present invention may be practiced with various solar cell array configurations, for purposes of this disclosure a solar array having an inverted "V" configuration will be used to describe the operation of the invention, said configuration being particularly amenable to use with the present invention.

Figure 1:
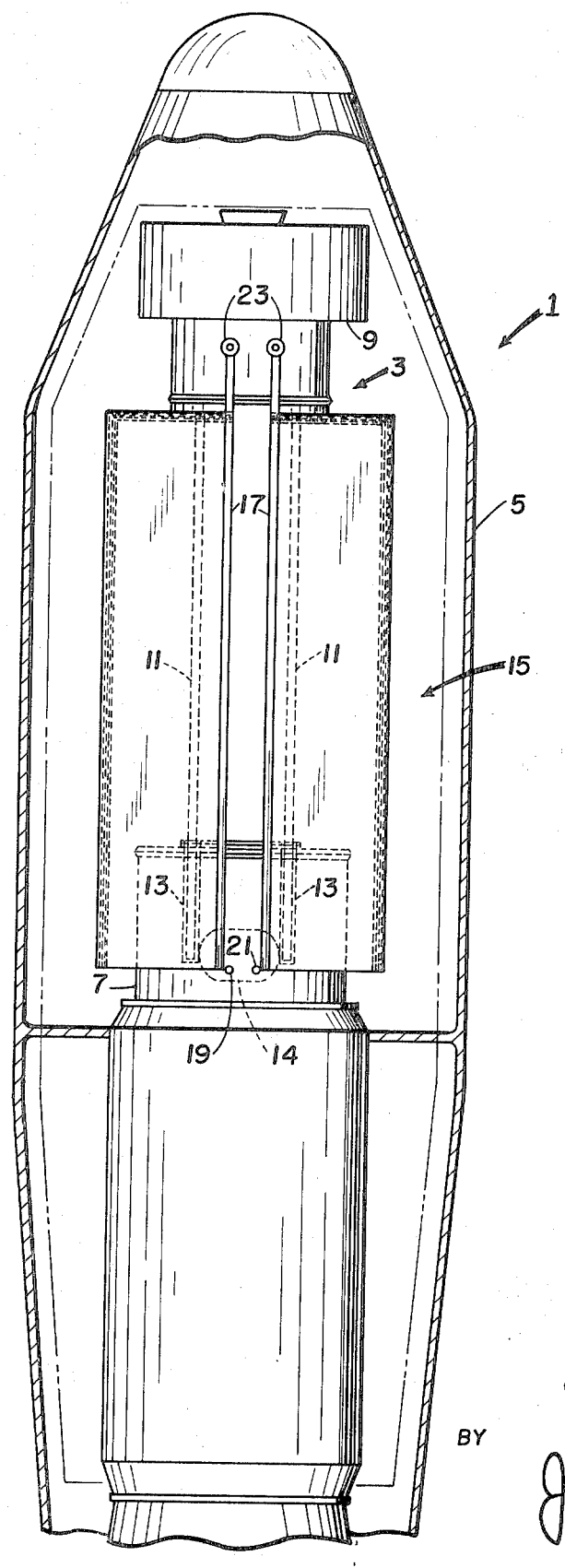
FIG. 1 is a section through the fairing of a launch vehicle, showing a stowed spacecraft in a prelaunch configuration.

Referring to the drawings and particularly to FIG. 1, a launch vehicle, seen generally at 1, contains a spacecraft 3 within fairing 5. The spacecraft 3 comprises, in part, a main body 7 and superstructure 9, said main body 7 comprising a payload and said superstructure 9 comprising a power conditioning unit. Twin masts 11 are seen partially stowed within recesses 13 in the main body 7 of the spacecraft. An erection package 14 comprises well-known means for erecting the masts 11, the particular mechanisms used for erection of the array not being limiting as to the method of the invention.

A solar cell array, shown at 15 in a prelaunch, unextended mode, comprises, in part, extendible booms 17 which are releasably joined to the main body 7 of the superstructure 9 by pivot pins 23. As can be seen in the other figures, particularly FIG. 4, the booms 17 consist of dual slidably interconnecting arcuate frame sections 17a conveniently and compactly stowable in telescoping fashion, requiring a small storage volume during launch. The array 15 further comprises telescoping solar panels 25, each panel 25 being connected to a section 17a of one of the booms 17. The panels 25 are preferably semicylindrical in shape so that solar cells 27 disposed on the surface thereof may be advantageously presented to incident solar energy. The panels 25 are extendible and retractable with the telescoping booms 17, the panels 25 and booms 17 acting as units movable relative to each other.

FIG. 2 depicts the spacecraft 3 after ejection from the launch vehicle 1 and during erection of the masts 11. The masts 11 are erected by suitable means, such as the aforementioned erection package 14, contained within the spacecraft 3. Extension of the mast increases the separation of the superstructure 9 from the main body 7 of the spacecraft, thereby "peeling out" the telescoping sections 17a of the booms 17 while the opposite end sections thereof are attached to the main body 7 and to the superstructure 9. The booms 17 and attached solar panels 25 extend with the masts 11 in a fashion quite similar to the extension of an optical telescope. The telescoping feature allows compact storage while in the prelaunch configuration and ready deployment by the simple expedience of an extendible mast.

FIG. 3 is a view of the spacecraft 3 in an orbital situation after the full extension of the masts 11. When the method of the present invention is practiced with an inverted "V" solar array as described herein, the booms 17 and attached solar panels 25 are released from the points of attachment 19 and 21 on the main body 7 of the spacecraft after full extension of the masts 11. Well-known releasable latch means may be utilized to perform this simple function. On release, the booms 17 swing out to a predetermined angle favorable to maximum power generation in all solar aspect angles, the determination of such angle being readily ascertainable but not being particularly pertinent to the present invention.

Figure 4:
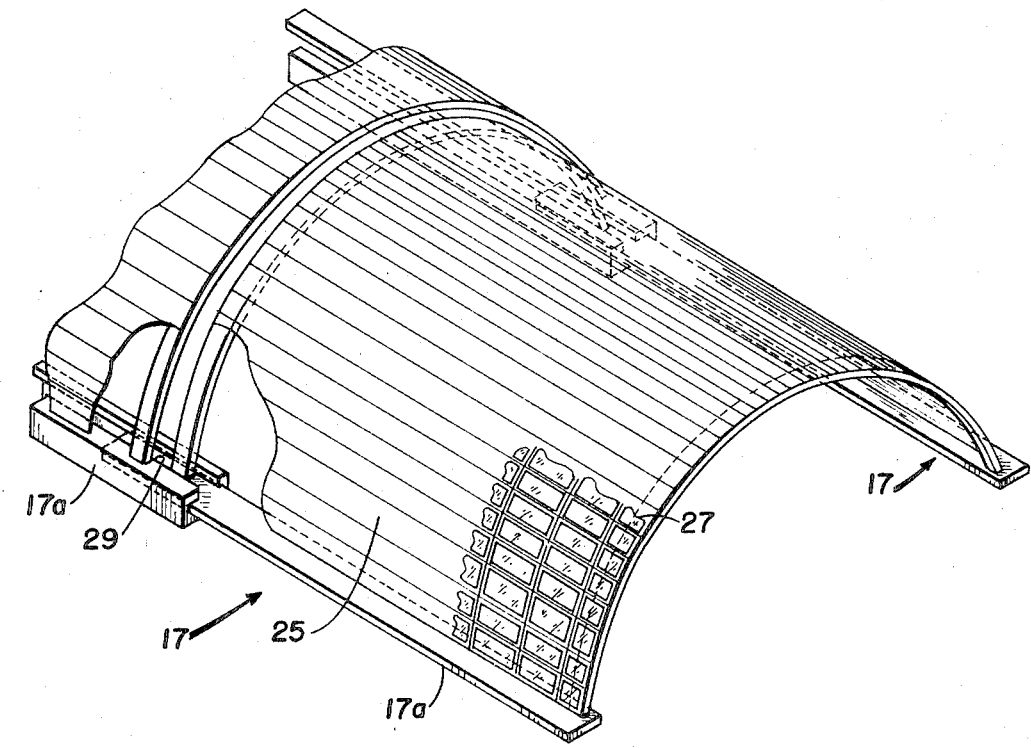
FIG. 4 is a perspective, partly broken away, showing portions of the telescoping solar array panels and of the boom bearing the panels.

FIG. 4 is a perspective of an end portion of one of the booms 17. The telescoping sections 17a are seen to interconnect at locking joints 29 along the boom 17.

Figure 5:
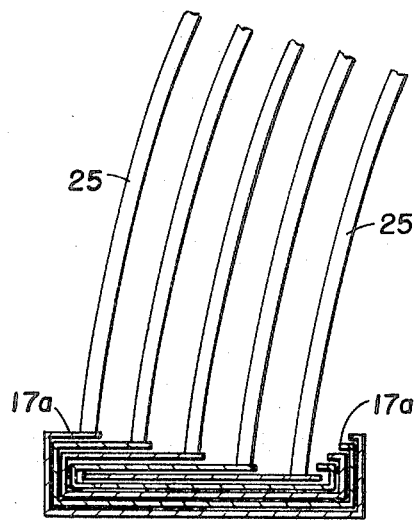
FIG. 5 is an enlarged detail section through cooperating portions of the telescoping array members which comprise the boom and solar array.

FIG. 5 shows a preferred configuration for constructing the telescoping sections 17a of the boom 17. The semicylindrical design of the inverted "V" solar array is seen in the construction of the panels 25. Construction of the boom 17 as shown in this view allows rapid and facile deployment of the array.

Power generated by the solar cells 27 is advantageously transmitted to the main body 7 along an electrically conductive path formed by the telescoping sections 17a of the booms 17 and the twin masts 11. It should be pointed out that the dual construction of the twin masts 11 provides two conductive paths which are mutually insulated to accomplish a complete circuit. Provision of the complete circuit may be accomplished by other means and still remain within the scope of the invention. For example, a single conductive mast which is split into two mutually insulated sections could be utilized instead of the twin masts 11. As another alternative, a single conductive mast having a coiled insulated conductive cable cooperating with the mast and providing a second conductive path could be used. The important consideration is that the mast structure be capable of extending the boom and solar array assembly and also be capable of providing a conductive path to the main body 7 of the spacecraft. Power distribution of the alternating current variety by suitable converters (not shown) would be desirable in order to minimize transmission losses and to avoid possible disruptive magnetic moments resulting from DC power transmission over the relatively long transmission path.

Restoring moments aiding stabilization of the spacecraft 3 are also provided by extension of the mast and boom assembly as has previously been described in the art. The multiple functioning of apparatus as described herein increases the wattage to weight ratio of the array, thereby increasing solar array efficiency through use of the present method.

Use of the present method is not restricted to operation with the solar array configuration described herein. Similarly, use of the method is not to be confined to the specific practices described herein. The present invention may be practiced in any of a number of alternate forms consistent with the intent of the invention as recited in the appended claims, viz, the attachment of the booms 17 directly to the mast 11 instead of to a spacecraft structural component, i.e., the superstructure 9.

I claim:

1. In a space vehicle, a method for deployment of a radiation responsive array having telescoping sections on which solar cell panels are disposed, the sections being stowable within a reduced volume in concentric relation, an outer section housing inner sections arranged mutually concentrically therein, comprising;
    joining deployment means to the outer section of the array;
    joining the innermost section of the array to the main body of the spacecraft; and
    extending the deployment means to pull the concentric inner sections from their stowed positions within the outer section, thereby exposing said sections to incident solar radiation.

2. The method of claim 1, and further comprising conducting power generated by the array from the array to the space vehicle through the mast itself.

3. The method of claim 1, and further comprising stabilizing the space vehicle by damping moments occurring on extension of the mast and array.

4. A deployable solar array for a spacecraft comprising;
    deployment means mounted on the spacecraft, said means having a free end extendible from the spacecraft on deployment thereof;
    a solar panel assembly including telescoping arcuate frame sections, each section having semicylindrical solar panels held thereon, the sections being of sequentially reduced dimensions to permit telescoping mating of said sections;
    said panel assembly having an inner telescoping section releasably joined to the spacecraft and an outer telescoping section joined to the free end of the deployment means;
    said deployment means on spatial extension of the free end thereof from the spacecraft pulling out the telescoping sections of the solar panel assembly to deploy said assembly.

5. The deployable solar array of claim 4, wherein said deployment means include longitudinally extendable boom means mounted on the spacecraft for spatial extension therefrom along a direction normal to the base line of said deployment means.

* * * * *